US006712166B2

(12) United States Patent
Rush et al.

(10) Patent No.: US 6,712,166 B2
(45) Date of Patent: Mar. 30, 2004

(54) ENERGY MANAGEMENT SYSTEM

(75) Inventors: Allan Rush, Lismore (AU); Michael Perry, Uralba (AU); Colin Kerr, Coffs Harbour (AU)

(73) Assignee: Permo-Drive Research and Development Pty. Ltd. (AU)

( * ) Notice: Subject to any disclaimer, the term of this patent is extended or adjusted under 35 U.S.C. 154(b) by 0 days.

(21) Appl. No.: 09/798,144

(22) Filed: Mar. 2, 2001

(65) Prior Publication Data

US 2001/0047654 A1 Dec. 6, 2001

Related U.S. Application Data

(63) Continuation of application No. PCT/AU99/00740, filed on Sep. 3, 1999.

(51) Int. Cl.⁷ ................................................ B62M 1/10
(52) U.S. Cl. ...................................... 180/165; 60/413
(58) Field of Search ................... 180/165, 2.1; 280/212; 60/371, 414, 418, 413, 417

(56) References Cited

U.S. PATENT DOCUMENTS

| | | | | | |
|---|---|---|---|---|---|
| 3,490,816 A | * | 1/1970 | Lyman | ...................... | 310/90.5 |
| 3,910,043 A | * | 10/1975 | Clerk | ......................... | 180/165 |
| 4,171,029 A | * | 10/1979 | Beale | ......................... | 180/54.1 |
| 4,278,403 A | * | 7/1981 | Shafer | ......................... | 417/38 |
| 4,351,409 A | * | 9/1982 | Malik | ......................... | 180/165 |
| 4,441,573 A | * | 4/1984 | Carman et al. | ............. | 180/165 |
| 4,986,383 A | * | 1/1991 | Evans | ......................... | 180/165 |
| 5,024,489 A | * | 6/1991 | Tanaka et al. | ................. | 303/3 |
| 5,050,936 A | * | 9/1991 | Tanaka et al. | ................. | 303/3 |
| 5,086,865 A | * | 2/1992 | Tanaka et al. | ............... | 180/165 |
| 5,088,041 A | * | 2/1992 | Tanaka et al. | ................ | 701/70 |
| 5,607,027 A | * | 3/1997 | Puett | .......................... | 180/242 |
| 5,647,318 A | * | 7/1997 | Feucht et al. | ................ | 123/322 |
| 5,708,312 A | * | 1/1998 | Rosen et al. | ................. | 180/165 |
| 5,799,562 A | * | 9/1998 | Weinberg | .................... | 60/414 |
| 6,170,587 B1 | * | 1/2001 | Bullock | ....................... | 180/165 |

FOREIGN PATENT DOCUMENTS

| | | |
|---|---|---|
| DE | 19531766 A1 | 3/1997 |
| EP | 0047643 A1 | 3/1982 |
| EP | 0863381 A2 | 9/1998 |
| WO | WO 96/10806 | 4/1996 |

* cited by examiner

Primary Examiner—Lesley D. Morris
Assistant Examiner—Kelly E Campbell
(74) Attorney, Agent, or Firm—Wolf, Greenfield & Sacks, P.C.

(57) ABSTRACT

An energy management system operable in three modes of operation to either drive or retard the drive shaft (110) of a vehicle, or in a neutral mode, to have no driving or retarding influence on the drive shaft. The system includes energy accumulating means (100, 101) which is operable to store and release energy through receipt and release of fluid, pumping means (104) in fluid communication with the energy communication means (100, 101), a reservoir (107) of fluid in communication with the pumping means (104), and coupling means for coupling the pumping means (110) to the drive shaft (110). Whereby in the retarding mode of the system, the drive shaft (110) drives the pumping means (104) to pump fluid to the energy accumulating means (100, 101), and whereby in the driving mode of the system, the energy accumulating means (100, 101) releases fluid to drive the pumping means (104) which drives the drive shaft (110). Whereby in the neutral mode of the system, the pumping means (104) is inoperative to exert any driving or retarding influence on the drive shaft (110). A retarding system is also provided, as is a terrain logging facility for logging the terrain of a route over which a vehicle travels.

39 Claims, 11 Drawing Sheets

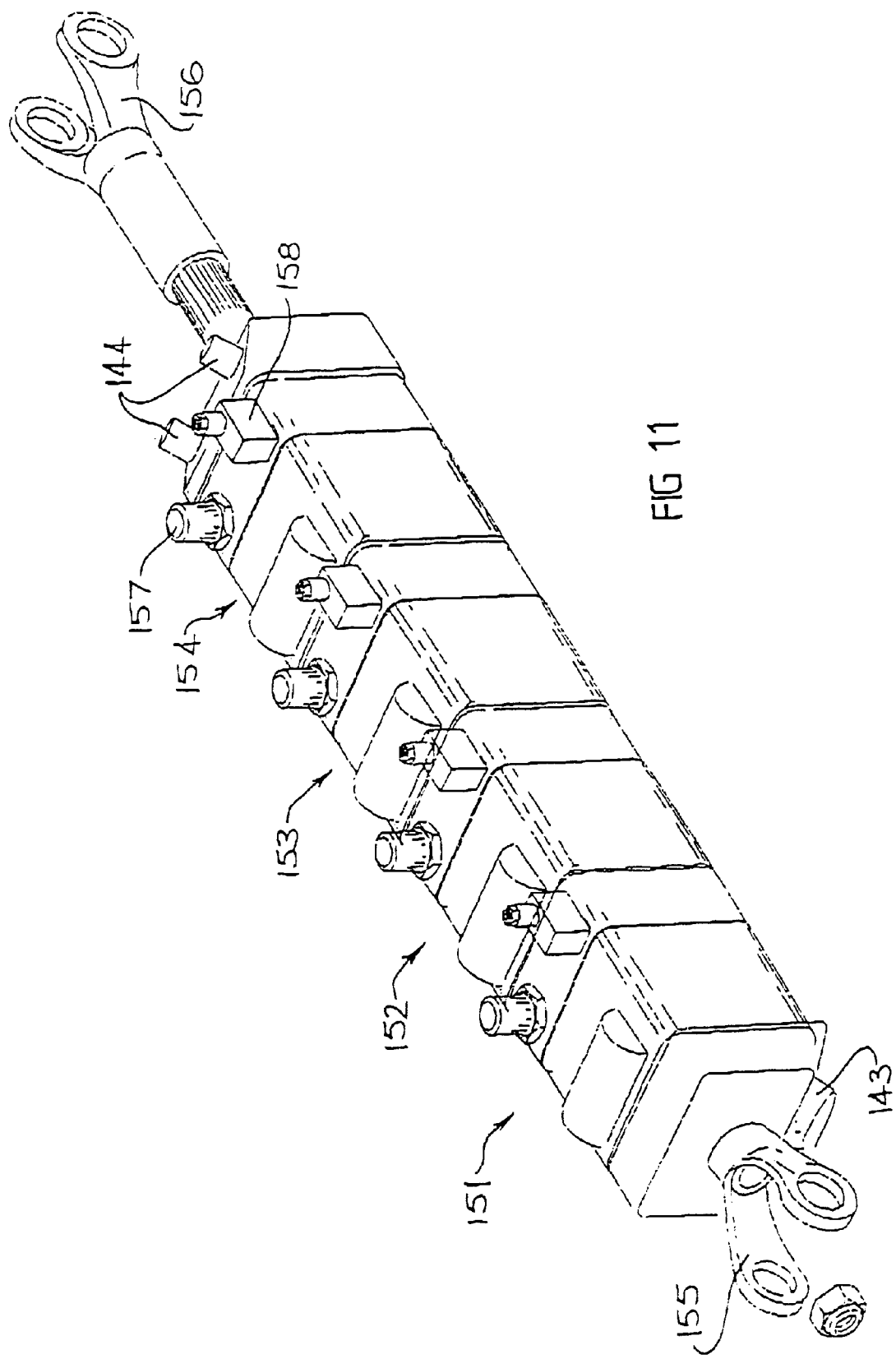

ENERGY MANAGEMENT SYSTEM

This application is a continuation of application No. PCT/AU99/00740 filed on Sep. 3, 1999 which claims priority on AU PP 5650 filed Sep. 3, 1998, both of which are hereby incorporated by reference in their entirety.

FIELD OF THE INVENTION

The present invention relates to an energy management system, in particular an automotive regenerative propulsion system for generating and accumulating propulsion energy by retardation of movement. The system has particular application to heavy land haulage vehicles, such as prime movers, and it will be convenient to describe the invention in relation to that particular application. However, it is to be understood that the invention has wider application such as to other types of automotive vehicles, such as light trucks, buses and cars.

BACKGROUND OF THE INVENTION

Regenerative propulsion systems are known and have been applied to trucks and buses in the past. Such systems harness energy by retarding the vehicle under braking conditions and accumulating that energy for later use to propel the vehicle. The known systems have however lacked flexibility in their operation, as they principally have been arranged to dump accumulated energy all at once, for example when a vehicle is accelerating from a standing start, while those systems that have allowed for more controlled release of stored energy, have not done so to optimum efficiency. The use of the energy in the known systems is therefore somewhat inefficient and the known systems therefore have not met with widespread use. Additionally, known systems are time consuming and labor intensive to install.

It is an object of the present invention to provide an improved regenerative propulsion system. It is a further object of the invention to provided a system that can be controlled to generate and release retarding energy more efficiently than known systems. It is a further object to provide a system that is relatively easy and quick to fit to a vehicle.

SUMMARY OF THE INVENTION

According to the present invention there is provided an energy management system operable in three modes of operation to either drive or retard the drive shaft of a vehicle, or in a neutral mode, to have no driving or retarding influence on the drive shaft, said, system including energy accumulating means which is operable to store and release energy through receipt and release of fluid, pumping means in fluid communication with said energy accumulating means, a reservoir fluid in communication with said pumping means, and coupling means for coupling said pumping reads to said drive shaft, whereby in said retarding mode of said system, said drive shaft drives said pumping means to pump fluid to said energy accumulating means, and whereby in said driving mode of said system, said energy accumulating means releases fluid to drive said pumping means which drives said drive shaft, and whereby in said neutral mode of said system, said pumping means is inoperative to exert any driving or retarding influence on said drive shaft.

As defined above, the system is applicable to or forms a replacement of the drive shaft of a vehicle. However, it is envisaged that the system could also be applied to a shaft that is not directly or indirectly driven, by the engine of a vehicle, but instead, the shaft may be the axle of a trailer and as such, the term "drive shaft" is therefore to be understood as embracing other such shafts to which the invention could be applied.

The drive shaft, or other shaft to which the system is applied, can operate independently of the system when appropriate by choosing the neutral mode of the system, however, rotation of the shaft can be assisted by system propulsion or retardation when appropriate. Thus, the system can exert greater control over the accumulation or dissipation of energy, by accumulating or releasing that energy when it is most desirable to do so, and not simply when it is possible to do so, such as in the prior art.

The system is coupled to the relevant shaft in any suitable manner, and in one arrangement, that coupling is made intermediate two sections of the shaft. For such an arrangement, the drive shaft may be provided in part, by two sections which are spaced apart to define opposed shaft ends and the system is provided between and connected to those two sections. For connection, the system may include a main shaft that is connectable to the opposed shaft ends by suitable means such as yoke connectors which are commonly employed between the drive shaft and the differential and gearbox described above, or it may include a full length drive shaft so that the system may be fitted to an existing vehicle simply by removing the existing drive shaft and replacing that with the drive shafts of the system. However other arrangements may also be employed.

In either arrangement described above, the drive shaft of the system can be driven or retarded so that the driving or retarding force applied thereto is transferred to the vehicle drive line and consequently the vehicle is driven or retarded accordingly. That drive or retard force is provided as an assistance to any drive and retarding systems which already form part of the vehicle, namely engine drive and braking systems and mechanical braking systems. Thus, the drive or retard force applied by the system may only be a portion of the overall drive or retard force applied to the vehicle.

It is however possible that the system apply the full drive or retard force, if the force required is within the available limits of the system. For example, the retard force available to be provided by the system may be sufficient to provide the sole retarding force to the vehicle, particularly in such situations when the vehicle is being retarded only slightly to maintain a constant speed on a downhill decline. In the reverse, it is not envisaged that the vehicle will be driven solely by the propulsion energy stored by the system, but that could occur if necessary.

In a first form of the invention, the coupling means of the energy management system includes an auto sequential gearbox that can drive the drive shaft of the system or which can be driven by the drive shaft depending on the mode in which the system is operating. This gearbox includes at least a pair of gears mounted on a second shaft that mesh with gears fitted to the main shaft. The pairs of meshed gears provide different ratios of drive and a selector facility is provided for manual or automatic selection of gear engagement depending on the ratio of drive or retardation required. The selector facility is preferably controlled electro-pneumatically, such as by a selector shaft controlled by a solenoid operated pneumatic actuator which moves laterally to the rotational plane of the gears and which includes means selectively engagable with one of the two pairs of meshed gears for transmitting drive. That engagement means may take any suitable form although it preferably includes a clutch mechanism, such as a dog clutch The auto sequential gearbox is connected to pumping means comprising a pump/motor arrangement that is driven by the second shaft and that operates as a pump in system retard mode and as a motor in system drive mode. The connection between the second shaft and the pumping means can be made by any suitable connection arrangement. The pump arrangement preferably employs a hydrostatic pump with variable displacement, so that the output of the system can be manually or automatically adjusted. For this purpose, the pump is preferably an axial piston pump which employs a tiltable swash plate that can be manually or automatically manipulated.

In an alternative form of the invention, the energy management system includes a complete drive shaft and connecting means, such as a pair of yokes disposed at either end of the drive shaft for connection of the drive shaft, between the gearbox and the differential of a vehicle. In this form of the invention, when the system is installed, the drive shaft of the system forms the drive shaft of the vehicle. This arrangement therefore differs from the first form of the invention, in which the system employs a main shaft that forms a section of the overall drive shaft. Between the yokes on the drive shaft, one or more pump assemblies are coupled to the shaft by coupling means and are driven by the shaft in the retard mode of the system, or drive the shaft in the drive mode of the system. The pumps are arranged or selected to provide no driving or retarding influence in the neutral mode of the system.

The pump or pumps which are coupled to the drive shaft may be coupled thereto in any suitable manner and in one form of the invention, the drive shaft is splined for splined connection with rotating parts of the pumps. In this arrangement, the shaft may drive the pumps through the splined connection, or may be driven by that connection.

The or each pump is again, in this form of the invention preferably of a variable displacement, hydrostatic kind, that employs a tiltable swash plate which can be manually or automatically manipulated. If more than a single one of these pumps is fixed so the drive shaft, the pumps preferably connected in series along the shaft between the yokes. Open circuit axial piston pumps can readily be employed in this arrangement although the pumps could alternatively comprise radial piston pumps.

An assembly of the above kind comprising a plurality of pumps preferably employs internal porting providing communication between adjacent pumps. External porting car be provided at either end of the assembly of pumps for ingress and egress of fluids. In an arrangement that employs two or more pumps, the adoption of internal porting permits the use of minimal external porting, so as to minimise the number of hydraulic hoses connected to the assembly. In one arrangement, the assembly employs external porting in the form of a single front port and two rear ports, the front port communicating with an outlet of the fluid reservoir, and the rear ports being in communication respectively with an inlet of the fluid reservoir and the energy accumulation means. Alternatively, the rear port in communication with the inlet of the fluid reservoir can communicate with the inlet of a cooling system which in turn communicates with the fluid reservoir. In most forms of the energy management system, a cooling system is necessary for cooling the fluid being pumped.

In a preferred form of the invention, fluid pressure to or from the pump arrangement is controlled by balanced logic control elements to maintain separate constant pressure rating between the pump assembly, the fluid reservoir and the accumulation means.

The pump arrangement of the invention is preferably connected by suitable hydraulic lines to the fluid reservoir. The cooling system (if provided) and to the energy accumulation means, which may be in the form of one, or preferably a pair of accumulators. The connection is preferably made through control means which preferably include a balanced logic controlled manifold that can maintain a constant pressure rating of hydraulic fluid between the pump arrangement and respectively the fluid reservoir and the accumulation means. Additional accumulators can be employed, in particular on a trailer pulled by the prime mover as the energy management system can be applied to the or each trailer pulled. Retardation can be provided by the system, by pumping oil through the control means to the accumulators, or if the accumulator are fully charged or only require partial charge, the oil can be pumped through the control means to the cooling system and then the reservoir with the same retarding effect. In this latter respect, it is not envisaged that the fluid reservoir be pressurised, although that could be achieved if desirable, but instead, the control means can provide resistance to the passage of fluid from the pumping means to the reservoir in the same way than the accumulators provide resistance, and that resistance can be deployed when retardation is required and the accumulators are fully charged.

The, or each accumulator preferably includes a housing, preferably cylindrical, which is closed at either end in a sealed manner and which includes a movable piston within the housing that separates the housing interior into first and second chambers. The first chamber carries a charge of compressible gas, while the second chamber is arranged by suitable valve means to receive and release therefrom, a substantially incompressible hydraulic fluid. The accumulators accumulate energy by increasing the amount of oil stored within the second chamber so that the movable piston is caused to move to reduce the volume of the first chamber and so compress the gas stored therewithin. The fluid is pumped into the second chamber by the pump arrangement when the vehicle is under retardation mode, and in this mode, the drive shaft of the system drives the pump arrangement and it is the load required to drive the pump arrangement that creates the retardation force on the drive shaft. Conversely, when oil is released from she second chamber by the force of the compressed gas pushing the movable piston to reduce the volume of the second chamber, the fluid drives the pump arrangement so that it acts as a motor to drive the drive shaft, so assisting propulsion of the vehicle.

The system can be controlled by a microprocessor that is connected by various sensors to various parts of the system. The microprocessor reacts to information received to govern the operation of the system, in particular, to govern the accumulation and release of energy to/from the accumulation means. The microprocessor can be a programmable logic controller of a simple or sophisticated nature. The controller can alternatively be a computer that can be manipulated manually if necessary.

The present invention further extends to a facility for removing load on the engine of a vehicle, at times when the momentum of the vehicle drives the engine. This occurs normally when the vehicle is traveling downhill when the momentum of the vehicle causes the drive shaft to become driven by the wheels of the vehicle through the differential and that drive causes the engine to be driven at a rate greater than idle, even though the engine is not actually propelling the vehicle. This results in the engine consuming fuel at a rate greater than it would under idle and the fuel consumed is wasted, given that there is no propulsive force generated.

All that is generated is a load on the engine which, while it does have a braking effect, also causes consumption of fuel as hereinbefore described and engine wear.

The load removal facility of this aspect of the invention can be provided by a mechanism that disengages the drive shaft from driving the engine, so that the engine can idle under load conditions of the kind described above. This facility can be identified as drive-line separation or DLS. Under the conditions described above and in a vehicle fitted with DLS, the engine consumes fuel at the rate it does under idle, which is the minimum consumption rate available. Any suitable arrangement can be adopted for this purpose and in one form, the mechanism is disposed along time drive shaft, between the engine and the vehicle gearbox. This mechanism includes a disengagable coupling, so that the drive shaft entering the engine can be disengaged from the drive shaft extending to the gearbox. Any suitable disengagable coupling can be employed, and for example, known clutch arrangements could be employed. However, it is preferable that the disengagable coupling be instantly recouplable, as distinct from gradually recouplable, such as is provided with standard automotive clutches that have a pair of opposed clutch faces that are brought gradually into full engagement.

The preferred mechanism employs a selectively engagable clutch that can slip in one direction of drive shaft rotation and which drivingly engages in the other direction. Such a coupling can be arranged to disconnect the separate sections of the drive shaft, when the engine starts to be driven by the drive shaft and to reconnect when engine drive resumes. For this, the mechanism can employ a ratchet-type coupling.

The above described mechanism can therefore operate so that on a downhill run of sufficient incline, the section of the drive shaft extending from the gearbox slips relative to the portion of the drive shaft extending to the engine, so that the latter drive shaft section is not driven and the engine can idle. When the incline begins to flatten out and the momentum of the vehicle reduces, the engine can resume drive of the drive shaft and the coupling between the two sections of the drive shaft will engage by virtue that the section of the drive shaft extending from the engine tends to rotate faster than the section extending to the gearbox.

Preferably the mechanism can be locked against disengagement and any suitable locking means for that purpose may be adopted. In one arrangement, a pin can be employed to lock the disengagable coupling parts together and that pin is preferably insertable through a pair of alignable bores provided in the respective coupling parts. Alternatively, a keyed arrangement may be employed. The pin, if employed, preferably can be inserted and removed from within one or both bores as required to lock or unlock the coupling. Movement of the locking means from a locked to an unlocked position preferably can be manually or automatically activated and any suitable arrangement for that purpose may be adopted.

The load removing facility as above described can be applied to a vehicle independently of the regenerative propulsion system, however they preferably are applied together. In such an arrangement, when the drive shaft is separated, the engine provides no braking effect, (like in a known vehicle such as when the gearbox is placed into neutral) and so the vehicle will tend to accelerate down an incline. To arrest that acceleration, it would be normal to apply the vehicle brakes, however, by application to the vehicle of the energy management system, the vehicle can be retarded without necessarily applying the brakes, or at least with less reliance on the brakes. That retardation can facilitate recharging of the accumulators as previously described, or if the accumulators are already fully so partially charged as appropriate, the retarding energy can simply be dissipated by pumping oil through a controller to the cooling system and then on to the reservoir.

The invention also extends to a terrain logging and prediction facility and that facility employs a memory that memorises the terrain of a certain vehicle route. Thus, the facility memorises the contour of a route, so that in advance, it has knowledge of level and inclined sections of the route and can control the energy management system so that energy can be accumulated and released at the most efficient rate. The facility preferably includes one or more inclinometers suitable to record the contour of the route and a memory, preferably in the form of a computer.

The facility can also be used to log a journey and to provide information either to the driver or to a remote station, as to the position or progress of the vehicle. As such, the facility preferably includes information storage means and transmission means for transmitting data.

BRIEF DESCRIPTION OF THE DRAWINGS

The attached drawings show example embodiments of the invention of the foregoing kind. The particularity of those drawings and the associated description does not supersede the generality of the preceding broad description of the invention.

FIGS. 9 to 11 show an alternative pumping arrangement for use in the energy management system of the invention.

DETAILED DESCRIPTION

Figure 1:
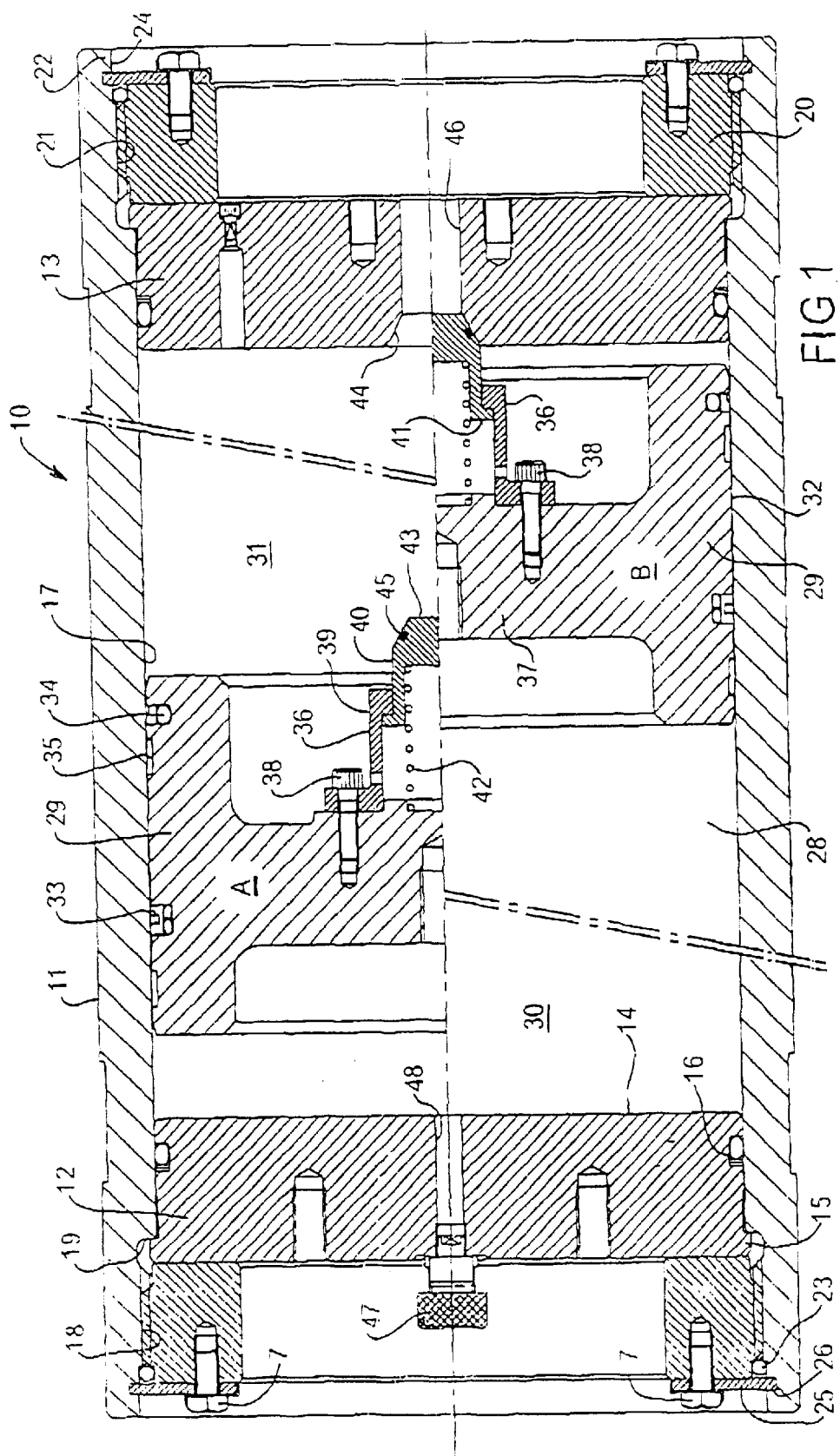
FIG. 1 is a cross-sectional view of an accumulator for use in the energy management system of the invention.

An accumulator of the kind developed for the present invention is shown in FIG. 1. The accumulator 10 is of elongate cylindrical construction and includes an outer cylindrical housing 11. Within housing 11, a pair of longitudinally spaced end caps 12 and 13 are disposed and each of these end caps includes a body portion 14 and an annular flange 15. The body portion 14 of each end cap 12, 13 has a diameter sufficient to be snugly received within the housing 11 and is provided with a groove 16 that can receive an O-ring seal to seal against the inside surface 17 of the housing 11. Other sealing arrangements may be provided as appropriate.

The annular flange 15 of each end cap 12, 13 is received within a recessed section 18 of the housing 11 and abuts against the step portion 19 of the recessed section 18. Engagement between the annular flange 15 and the step portion 19 limits movement of the end caps 12, 13 toward each other and sets the volume of the accumulator. The end caps 12, 13 are fixed in position, by a threaded locking ring 20 that threadably engages the inside surface 21 of the recessed section 18. At the end of the threaded section of the locking ring 20 remote from the respective end caps 12, 13, a further recessed section 22 is provided and a further O-ring 23 can be disposed between the locking ring 20 and the inside surface 24 of the recessed section 22. The O-ring 23 is retained in the position shown, by an annular flat key 25, which is of such an outer diameter to fit within a groove 26 machined in the recessed section 22. The flat key 25 is secured to the locking ring 20 by a plurality of threaded fasteners 27. The arrangement described securely seals the interior of the accumulator 10 existing between the end caps 12, 13 against leakage of fluid therefrom.

The interior 28 of the accumulator 10, is separated into two chambers, one of which is filled with a fixed amount of compressible nitrogen gas, while the other chamber is arranged to receive and discharge hydraulic oil therefrom. Nitrogen gas is the preferred choice of compressible gas because nitrogen is inert, cost effective and the most suitable gas known for use in accumulators, although a range of other gases could be employed. The hydraulic oil is preferably that marketed under the name CASTROL HYSPIN IWH68 which has good pressure and temperature characteristics, although other oils, such as vegetable oils could be used and it is envisaged that in the future a mixture of high pressure range suitable oil and water could be employed.

In FIG. 1, a central piston 29 is shown and that piston is shown separated along the longitudinal center-line of the housing 11, into an extreme left-hand and right-hand position. It needs to be appreciated however, that in practice, the piston 29 cannot be separated as shown and will adopt in its entirety a fully left-hand position, a fully right-hand position, or a position therebetween. The position of the piston 29 is dependent on the charge of the accumulator. For illustration purposes, the nitrogen gas is accommodated in the left-hand chamber 30, while the hydraulic oil is accommodated in the right-hand chamber 31.

The piston 29 is cylindrical and is a close fit within the inside surface 17 of the housing 11. The outer surface 32 of the piston 29 is sealed against the inner surface 17 by a pair of seals 33 and 34 The seal 33 is preferably a combination of a TURCON AQ-seal 5 (250×12×5.75) and Quad ring seal (234.55×3.53) and O-ring (227.97×5.33), while the seal 34 is an O-ring. A sliding ring 35 is also provided for sealing purposes. Clearly, other sealing arrangements can be employed, which are suitable to prevent leakage of fluid between the chambers 30 and 31.

The piston 29 includes a valve member 36 that is fixed to a central body portion 37 by threaded fasteners 38. The valve member 36 is formed in two parts 39 and 40 that nest together at a flanged joint 41. A spring 42 maintains the parts 39 and 40 in the extended arrangement shown. The valve part 39 includes a frustoconical valve head 43 for sealing engagement within a complimentary but reverse shaped frustoconical recess 44 formed in the end cap 13. The valve head 43 includes an annular groove for receiving an O-ring 45 for sealing against the surface of the recess 44.

A conduit 46 extends from the recess 44 and the combination of the recess 44 and the conduit 46 constitutes an inlet/outlet passage to the chamber 31. Movement of the piston 29 within the housing 11 occurs as a result of the accumulator 10 being charged or discharged. When the enemy management system is in retardation mode, then the accumulator will be being charged, so that oil will be forced into the chamber 31 through the conduit 46 and the recess 44, forcing the piston 29 toward the upper A piston position shown and compressing the gas accommodated in the chamber 30. When the system is in discharge mode, the reverse occurs and the compressed gas forces the piston toward the lower B piston position forcing the oil out of the chamber 31 through the recess 44 and the conduit 46. When the accumulator is completely discharged, the valve head 43 sealingly engages in the recess 44, so that further egress of oil out of the chamber 31 is prevented. A small amount of oil is maintained in the chamber 31, for lubrication purposes, ie to lubricate between the inside surface 17 of the housing 11 and the outer surface 32 of the piston 29.

The end cap 12 includes a gas valve assembly 47 that extends into a conduit 48. The gas valve assembly 47 facilitates ingress or egress of gas from within the chamber 30 and generally is used to fill the chamber 30 with gas to the operating pressure and to top-up the gas as leakage occurs over time. The gas valve assembly can also be used as an emergency release to discharge the chamber 30 when necessary. The gas valve assembly comprises a 6000 PSI working pressure valve that has an appropriate safety operation to release pressure in the event of over pressurisation, although various other assemblies could equally be used.

The accumulator 10 operates in the following manner. To charge the accumulator, hydraulic oil is pumped into the chamber 31 under pressure through the conduit 46. As the chamber 31 fills with oil, the piston 29 is driven toward the end cap 12 causing the gas within the chamber 30 to be compressed. It should be appreciated that hydraulic oil is largely incompressible and therefore fluid compression effectively only occurs in the chamber 30. Oil can continue to be pumped into the chamber 31 until maximum compression of the gas in the chamber 30 occurs. That will occur when the piston 29 has reached the upper A piston position illustrated. The maximum gas compression is determined by a variety of factors, such as material strength of the housing 11 and the end cap 12, the capability of the various seals to retain the pressure and local transport standards that govern pressure vessels on road vehicle. A typical maximum gas compression in the chamber 30 is 42 MPA.

At the maximum charged condition of the accumulator 10 when the piston 29 is in the upper. A position, and for all positions of the piston 29 between the upper A position and the tower 5 position, energy can be discharged from the accumulator. Thus, when accumulated energy is required, oil is released from the chamber 31, through the conduit 46 by action of the compressed gas in the chamber 30 driving the piston 29 toward the lower, B piston position. The accumulated energy can be completely or partially discharged depending on the energy requirements and equally, the accumulator can later be completely or partially charged, depending on the retarding energy available to pump oil into the chamber 31. That is, it is not necessary for proper working of the accumulator to completely charge and completely discharge. Additionally, it is appropriate for the accumulator to be partially or fully discharged when it is only partially charged, and a plurality of discharges can occur without necessarily requiring recharging.

One form of gearbox developed for the present invention is known as an auto sequential transfer gearbox and for the purposes of the invention, the auto sequential gearbox is mounted to the vehicle drive line between the existing vehicle gearbox and differential, where a rubber shock mounted universal joint would normally be positioned in known prime movers. The auto sequential gearbox does not interfere with the normal function of the vehicle drive line, but provides retardation or propulsion assistance when desired. That is, if the regenerative propulsion system is fitted to a vehicle but is not in use, the vehicle will operate as if the system was not fitted.

Figure 2:
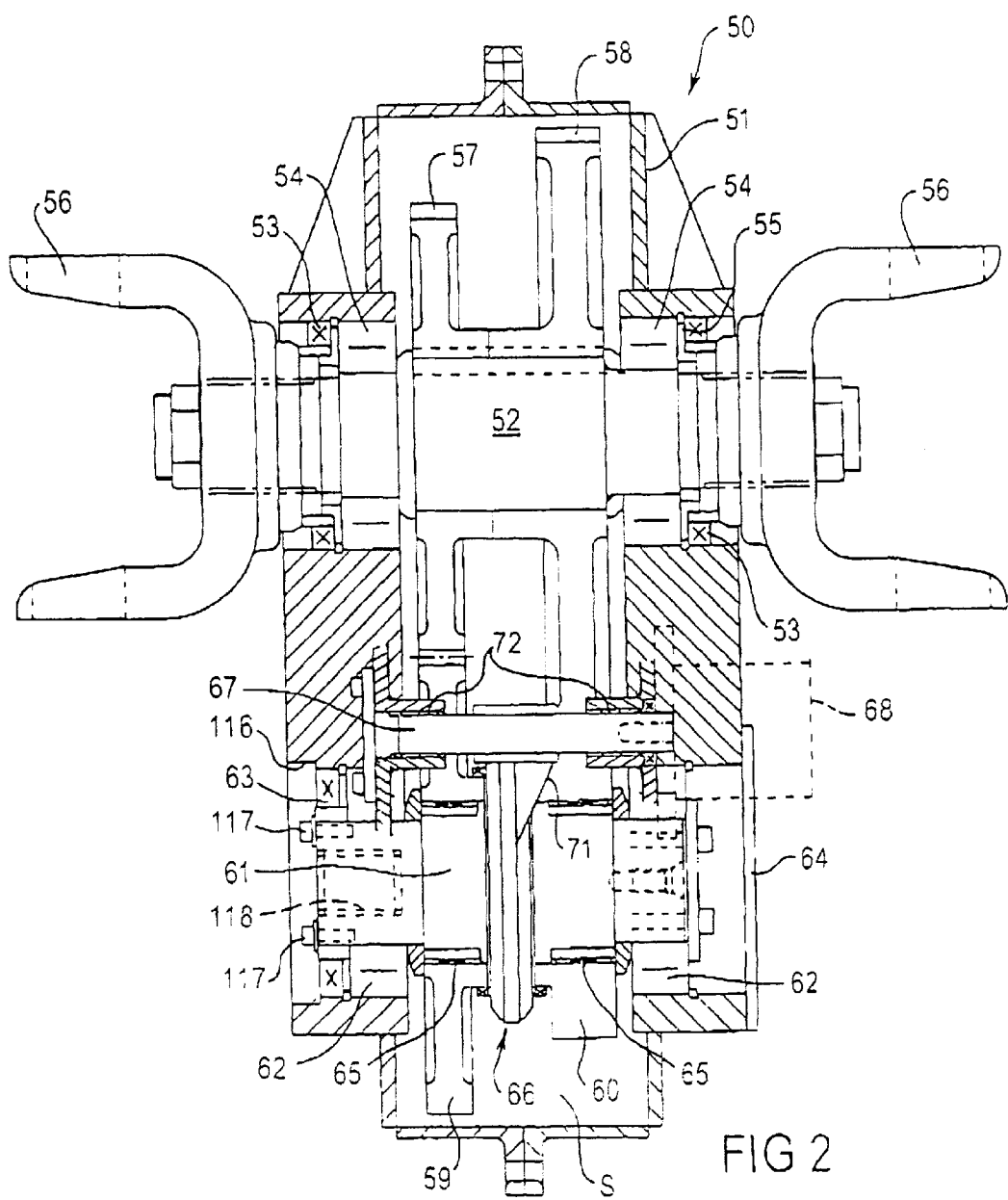
FIG. 2 is a cross-sectional view of an auto sequential transfer gearbox.

The auto sequential gearbox 50 shown in FIG. 2 includes a housing 5, that sealingly accommodates a rotatable main or top shaft 52. Seals 53 are provided for sealing the to shaft 52 within the housing 51, while cylindrical roller bearings 54 locate and facilitate rotation of the shaft 52 relative to the housing 11. A circlip 55 locates the roller bearings 54 relative to the housing 51 Attached to each end of the top shaft 52 is a yoke 56 and each yoke is arranged for connection to a similar yoke or other appropriate connector attached to the drive shaft of the vehicle. When the system is not in operation the top shaft 52 will rotate under the influence of the vehicle drive shaft The top shaft 52 includes a pair of spaced-apart coaxial gear wheels 57 and 58 and these are fixed to the shaft in any suitable manner. The gears 57 and 58 are arranged for engagement with a further pair of gear wheels 59 and 60 respectively, disposed on a second or bottom shaft 61. Like the top shaft 52, the bottom shaft is rotatably located relative to the housing 51 by cylindrical roller bearings 62. The arrangement only requires sealing by seals 63 at one end of the bottom shaft 61, as the housing at the other end is closed by a plate 64. The gears 59 and 60 are mounted to the bottom shaft 61 on needle roller bearings 65 to facilitate relative rotation between the respective gears and the bottom shaft, when required. The needle roller bearings 65 are immersed in oil contained in the gear case sump S for lubrication purposes, while the gears 57 and 58 are lubricated by oil splash.

Disposed between the gears 59 and 60, is a dog clutch 66, that controls transmission between the top shaft 52 and the bottom shaft 61 through the gears 57 to 60. The dog clutch 66 is controlled by a selector rod 67 which is electron-pneumatically operated by solenoid activation of a pneumatic actuator 68 (shown in dot outline) to engage and disengage the dog clutch from either of the gears 59 or 60 and a connecting web 71 extends in connection between the selector rod 67 and the dog clutch 66. The selector rod 67 is located relative to the housing 11 within bushes 72. Movement of the selector rod 67 is through a distance of only several millimeters.

In the arrangement shown, engagement of the gear 59 with the dog clutch results in transmission between the top and bottom shafts 52 and 61 through the gears 57 and 59. Conversely, engagement of the gear 60 with the dog clutch 66 results in transmission between the top and bottom shafts through the gears 58 and 60. Movement of the dog clutch 66 to a neutral position intermediate the gears 59 and 60 results in no transmission between the top and bottom shafts. Whichever of the gears 59 and 60 is not engaged by the dog clutch 66, rotates freely about the bottom shaft or its respective needle roller bearing 65. In the neutral position of the dog clutch, both gears 59 and 60 an rotate freely on the bottom shaft (assuming the top shaft is rotating). It is envisaged that the separate gear ratios between the gears 57 and 59, and 58 and 60 will be 1:1 and 1:2, although those ratios can be altered as necessary to suit the particular application involved. Operation of the dog clutch in as much as engagement with the gears 59 and 60 is concerned, would be well understood by a person skilled in this art.

The dog clutch 66 is slidably fixed to the bottom shaft 61 and prior to engagement of the dog clutch to either of the gears 59 or 60 the shaft 61 is rotated up to a speed equal to that of the gears 59 to 60 to enable smooth engagement of the dog clutch therewith. The pump arrangement drives the bottom shaft 61 under accumulated pressure for that purpose although other means to achieve this could also be employed.

The auto sequential gearbox 50 is connected to a pump, which in turn is connected to the accumulator 10. When oil is being received by the accumulator 10, that oil is being pumped into the accumulator by the pump arrangement that is driven by the bottom shaft 61 of the auto sequential gearbox. For that drive to occur, one of the pair of gears 57, 59 or 58, 60 is required to be engaged by the dog clutch so that the bottom shaft 61 is driven by the top shaft 52. This occurs when motion of the vehicle is under retardation and the mechanism of the drive just described which results in oil being pumped into the accumulator, results in a retarding load being placed onto the top shaft 52 and hence a retarding effect applied to the vehicle. That is, to retard the vehicle, the top shaft 52 is connected by either of the gears 57 or 58 to the gears 59 or 60 respectively, so that the top shall drives the bottom shaft 61 which in turn drives a pump arrangement that pumps oil into the accumulator. It is the driving load of the top shaft 52 that generates motion retardation on the vehicle.

If motion retardation is required beyond the point where the accumulator 10 is fully charged with oil, the top shaft 52 continues to drive the bottom shaft 61, and hence the pump arrangement, but the oil is then pumped directly to a reservoir via a balanced logic control element which maintains a constant oil pressure, for example in the region of 42 MPA, prior to release to an oil cooler and then to the reservoir. Thus, even though the accumulator is fully charged, motion retardation can still be provided.

When the system is operating to provide a propulsive force, then the accumulator, by virtue of the oil being released therefrom, drives the pump arrangement, which in turn drives the bottom shaft 61 and through the gear connection selected, the too shaft 52 is driven. Drive of the top shaft 52 causes drive of the vehicle drive shaft, providing assistance to propel the vehicle, generally when the vehicle is travelling up an incline or the vehicle is accelerating to traffic speed from a standing start or from low speed.

Figure 8:
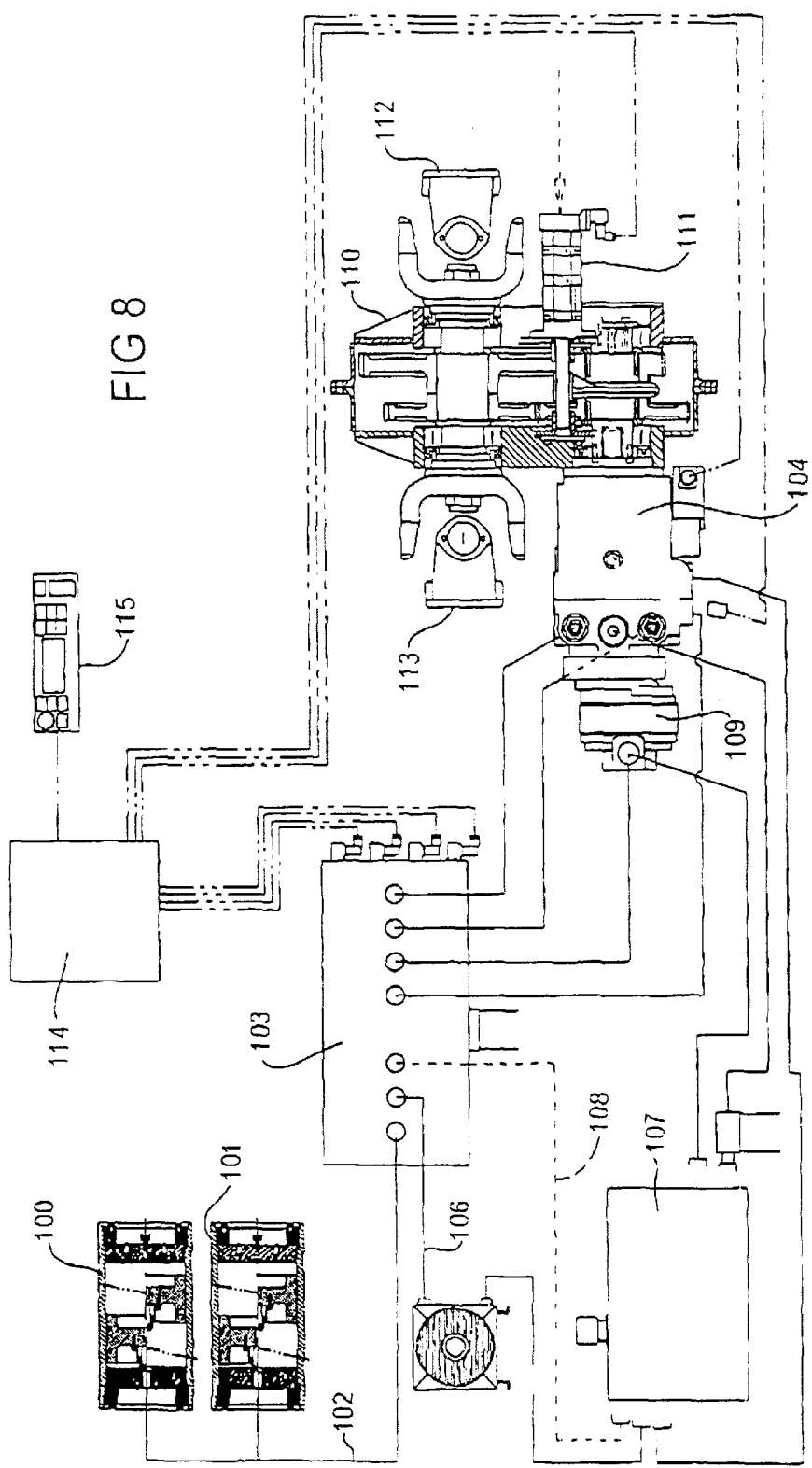
FIG. 8 is a layout view of an energy management system according to the invention.

The pump arrangement can take any suitable form. It is preferred that the arrangement employs a pump which is of the hydrostatic kind and is reversible to act both as a pump and a motor depending on the requirements of the system. Such a pump can employ a charge pump although that is not essential. The pump is also preferably a variable displacement pump and a suitable pump employs a tiltable swash plate that is used to vary the displacement by movement thereof. Such pumps are well known. Reversing the angle of the swash plate results in reversing the flow of oil from the pump, so that the pump can operate as a motor to drive the system. Pumps of the above kind are well known and their attachment to the auto sequential gearbox 50 of FIG. 2 can be made in any suitable manner. The pump arrangement is not shown connected to the gearbox 50 in FIG. 2, but the facility for connection is shown. That facility includes a recess 116 and bolt connectors 117. Moreover, a bore 118 is shown and this bore 118 is provided in the bottom shaft 61 and a splined shaft is connected thereto, although a pump shaft extending from the pump arrangement could equally be employed. The connected arrangement is shown in FIG. 8 in which the pumpmotor 104 is shown connected to the gearbox 110.

Figure 3:
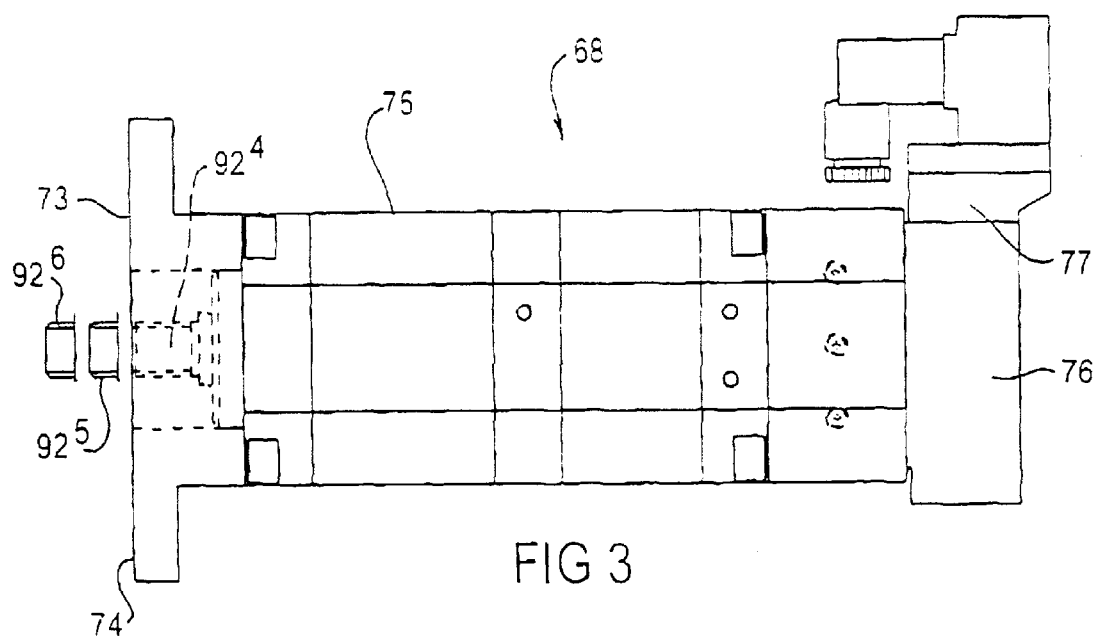
FIGS. 3 to 7 show detailed views of the pneumatic actuator shown in FIG. 2.
Figure 4:
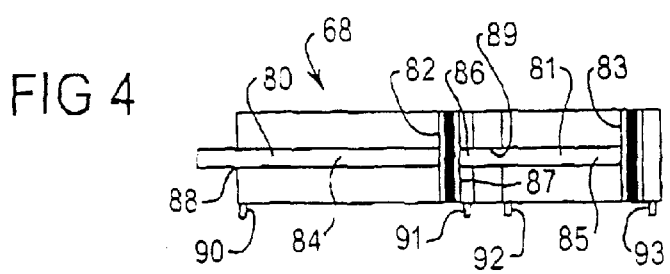

The pneumatic actuator 68 shown in dot outline in FIG. 2 is shown in more detail in FIGS. 3 to 7. FIG. 3 shows an external view of the actuator 68, while FIGS. 4 to 7 are schematic cross-sectional views longitudinally of the actuator. Referring to FIG. 3, the actuator 60 includes a front mounting block 73 that is of square barrel construction which is cylindrically bored internally and that has an annular flange 74 for connection to the housing 51. The connection is not shown, but is releasable and can be made in any suitable manner such as by bolting the flange 74 to the housing 51. The mounting block 73 is connected to a square cylindrically internally bored housing 75 that houses a piston arrangement which is shown in FIGS. 4 to 7. The mounting block 73 can be connected to the housing 75 by any suitable manner and may be threadably attached thereto. Standard sealing arrangements may be employed to seal the connection.

The other end of the cylindrical housing 75 is connected to a ported end plate 76, which supports in any suitable manner two solenoid actuated pneumatic valves 77 (only one of the valves 77 can be seen in FIG. 3), that can, be for example five ported, two position, spring returned pneumatic valves. Other valves may also be appropriate. The end plate 76 may also be connected to the housing 75 in any suitable manner like the mounting part 73. The solenoid valves govern the passage of pressurised air to the pneumatic actuator 68 as described hereinafter.

Referring to FIGS. 4 to 7, the pneumatic actuator 65 includes a pair of pistons 80 and 81, each of which includes a respective head 82 and 83 and a respective shaft 84 and 85. The pistons 80 and 81 are axially aligned and the end 86 of the shaft 85 engages against the rear surface 87 of the head 82 in the disposition of the pistons shown in FIGS. 4 and 5. The end 86 is separated from the rear surface 87 in FIG. 6. Each of the pistons is axially movable longitudinally of the housing 75 and that movement is guided by engagement of the peripheral edge of the respective heads 82 and 83 with the inside surface of the housing 75, and by engagement of the respective shafts 84 and 85 within guide bores 88 and 89.

Movement of the pistons 80 and 61 within the housing 75 is governed by airflow into and out of the housing through ports 88 to 91, as follows.

The ported end plate 76 has an inlet port for passage of pressurised air and two exhaust ports to which silencers may be fitted. Air entering through the inlet then enters the solenoid valves 77 which distribute the air through internal actuator ports in the housing 75 and the end plate 76. The points 88 to 91 are schematically shown and these ports form part of the internal portion mentioned above.

Figure 7:
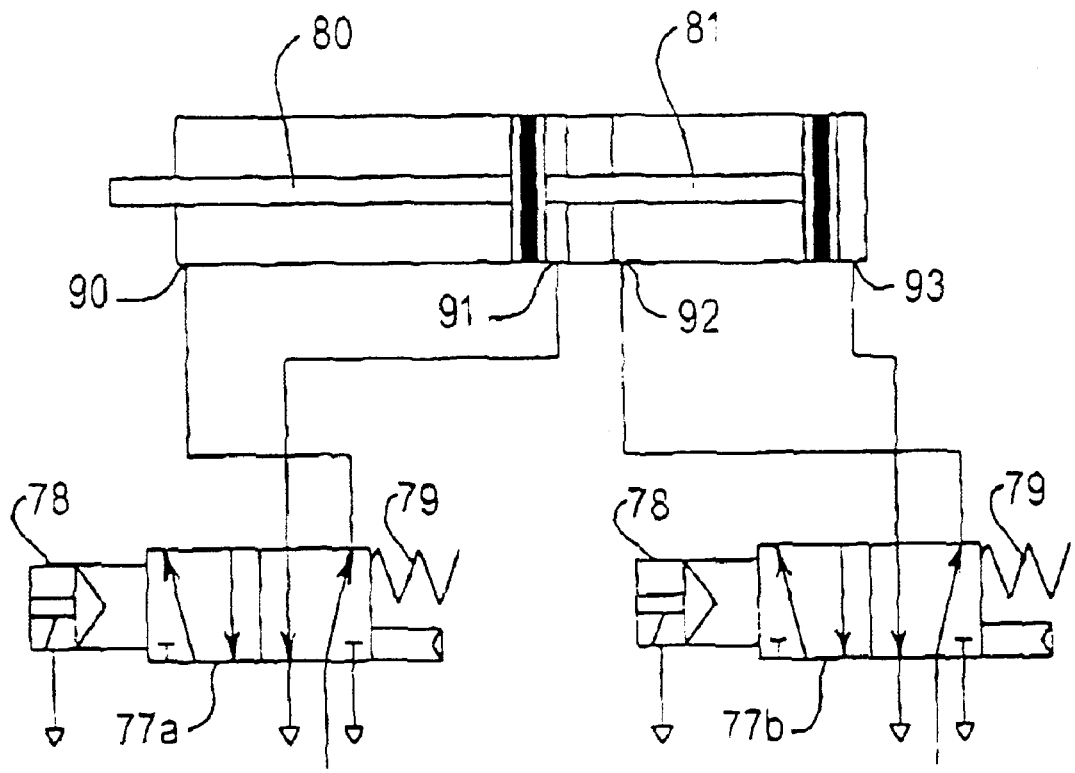

FIG. 7 schematically shows the solenoid valves 77a and 77b in communication with the ports 88 to 91. This figure also shows the solenoid actuator 78 and the spring return 79.

In the position shown in FIG. 7, only solenoid 77b is energised and as such, the ports 90 and 92 receive pressurised air, while the ports 91 and 93 are exhausted to atmosphere. This figure corresponds with FIG. 4 and in this position the selector rod 67 is positioned so as to engage the dog clutch 66 with the gears 57 and 59 in a 1:1 ratio.

Figure 5:
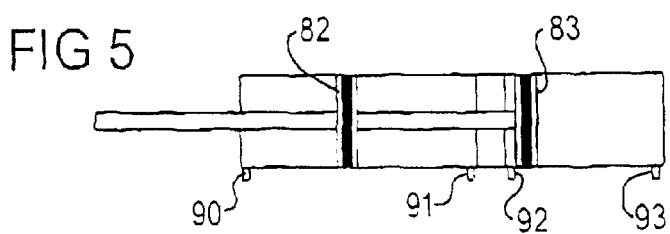

Movement of the pistons 80 and 81 to the position shown in FIG. 5 is by inflow of air through the ports 90 and 93 and by exhaust of air through the ports 91 and 92. In this position neither of the solenoid valves is energised and pressurised air exists behind the head 63 and in front of the head 82. Because the area of the piston 81 on which air pressure through the port 93 acts is greater than the area of the piston 80 upon which air pressure through the port 90 acts (due to the existence of the shaft 84 on the port 90 side of the piston 80) then the shaft 80 is held in the position shown. In this position, the selector rod 67 has been moved so as to disengage the dog clutch from the gears 57 and 59 and to move it to a position intermediate the respective pairs of gears, so that there is no drive between the top shaft 52 and the bottom shaft 61 and this is the neutral position of the management system. In this position the top shaft 52 can rotate independently of the bottom shaft, so that in effects, in neutral, the management system has no influence on the normal drive shaft of the vehicle.

Figure 6:
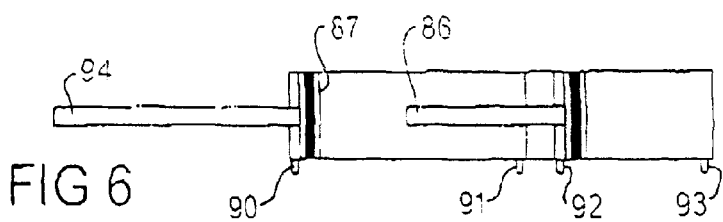

Maintaining the piston 80 in the neutral position of FIG. 5 is achieved by engagement thereof with the piston 81. Movement of the piston 80 to the position shown in FIG. 6 is by inflow of air through the port 9 and by exhaust of air through the port 90. In this position the solenoid 77a is energised while the solenoid 77b is de-energised and the selector rod 67 has been moved so as to engage the dog clutch 66 with the gears 58 and 60 in a 1:2 ratio.

In the position on of FIG. 6, the p stop 30 is driven fully to the end of the actuator and there is no necessity to maintain pressure through the port 93. In practice however, pressure has been maintained through the port 93, given that in this state the solenoid is de-energised, ie removal of pressure through the port 93 would require energisation of the solenoid.

The pneumatic actuator 68 advantageously facilitates the disposition of the selector rod 67 in one of three different positions. The three different extensions of the shaft 84 from the housing 75 are shown in FIG. 3 in which the end of the shaft 84 is designated by the reference numeral $92^4$, $92^5$ and $92^6$, corresponding to the extent of the shaft 84 shown in FIGS. 4 to 6 respectively.

The end 94 of the shaft 84 is fixably attachable to the selector rod and a screw threaded attachment is appropriate. Other alternative arrangements may also apply and for example, the selector rod 67 may be biased towards the shaft end 92 by suitable biasing means, so that it moves with the shaft 84 between the positions shown in FIGS. 4 to 6.

Control of the pneumatic actuator 67 can be by any suitable electrode pneumatic circuit such as that shown in FIG. 7. A layout of a system according to the invention is shown in FIG. 8. The layout includes a pair of accumulators 100 and 101, which are connected by high pressure hydraulic fluid lines 102 to a balanced logic controlled manifold 103. The manifold 103 can divert oil received either from the accumulators, or from the pump/motor 104 under controlled conditions, specifically to maintain a constant pressure rating between the pumpmotor 104 and the accumulators. For example, an oil cooler 105 is connected to the manifold 103 by high pressure fluid line 106 and that cooler cools oil in a known manner before releasing the oil to a hydraulic reservoir 107. Not all oil may be passed through the cooler 105 and the fluid line 108 shown in dot outline, provides a passage for hydraulic fluid that by-passes the cooler 105. The line 108 can be used to pump excess fluid directly to the reservoir 107, when the accumulators 100/101 are fully charged or when they do not require the full level of fluid being pumped That fluid generally will not require cooling, because heating of the fluid normally occurs in fluid released from the accumulators. The oil cooler 105 can have any suitable form such as is commonly known in the hydraulic industry.

The system shown in FIG. 8 can employ any number of filters suitable to filter the oil as necessary. Conveniently these may be located as necessary at the inlet and outlets of the reservoir, although other filter locations may equally be provided.

The reservoir 107 is connected to the pump/motor 104 and the pump/motor draws on fluid contained in the reservoir for pumping to the accumulator. Likewise, fluid released from the accumulator to drive the pump/motor 104 is returned to reservoir 107 after it passes through the pump/motor 104. Like the oil cooler, oil reservoirs are well known and the reservoir suitable for use with the present invention can be of any known, suitable form.

The system shown in FIG. 8 includes a charge pump 109 and the charge pump operates to ensure that a permanent supply of oil is available to the inlet side of the pumpmotor 104. The charge pump 109 is generally required in closed loop hydrostatic pump systems in which the pump is unable to draw oil from the oil reservoir. A charge pump is normally used to top up losses in a system as oil passes through the closed loop on return to the pump. In the system of the invention, the oil does not always loop back through the system, so that the charge pump is required to provide the pump with a constant quantity of available oil at all times. The system can employ an internal charge pump and/or an external charge pump. In the pump arrangement depicted, both an internal (not visible in FIG. 8) and an external charge pump are provided. The external charge pump 109 is provided because the internal charge pump cannot always provide sufficient oil.

The system could operate effectively without a charge pump by the use of alternative hydrostatic pump. The elimination of the charge pump is preferred, as that reduces the power drain in the system and so system efficiency is increased.

The auto sequential gearbox 110 is as earlier although in FIG. 8, it is shown connected to the pump/motor 104 and the pneumatic actuator 111. The FIG. 8 layout also snows the connections to the prime mover differential at 112, and the prime mover gearbox at 113.

The FIG. 8 layout further shows microprocessor 114 which is connected to a variety of sensors and solenoid actuators as previously described via electrical connectors shown in dotdash form. The microprocessor 114 is also connected electrically to the balanced logic controlled manifold 103 and to the command module 115 that sits within the drivers cabin. An example controller layout is shown in FIG. 9.

Figure 9:
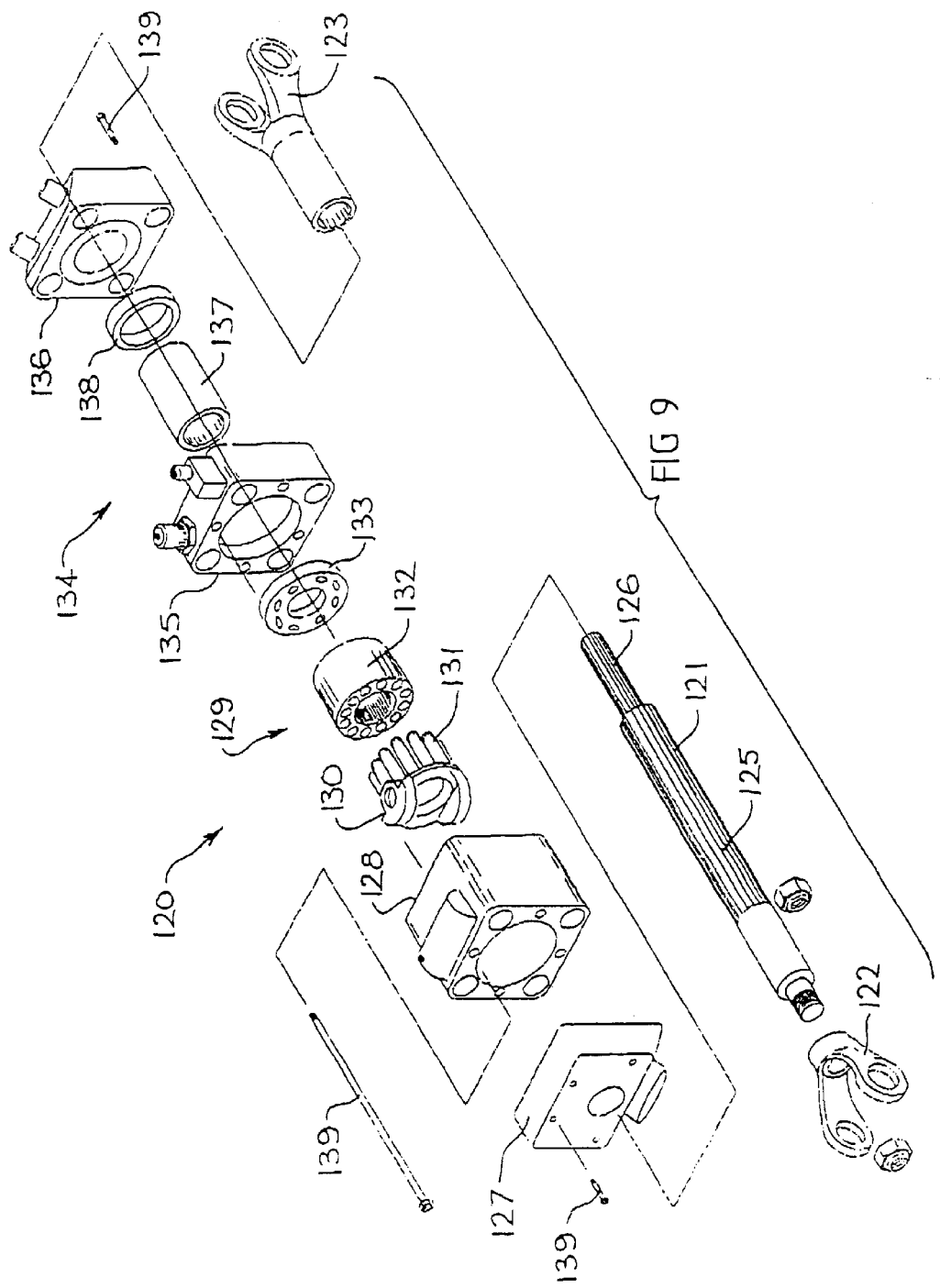
Figure 10:
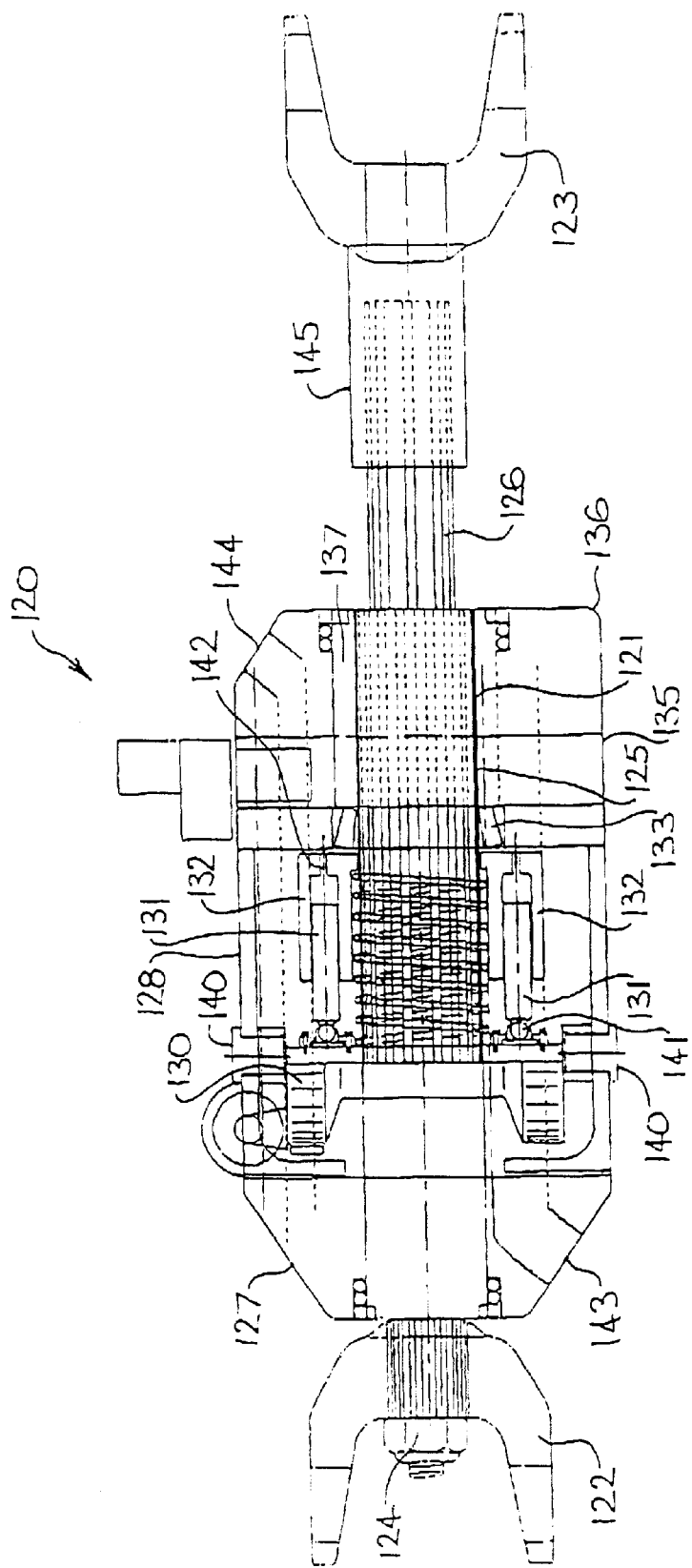

An alternative pumping arrangement is shown in FIGS. 9 to 11, and in that arrangement, the transfer case and the auto sequential gearbox of FIG. 2, along with the actuating arrangement shown in FIGS. 3 to 7, are not required. The arrangement 120 shown in FIGS. 9 to 11 is highly advantageous in that that it employs a single through shaft 121, to which yokes 122, 123 are attached at opposite ends thereof. In this arrangement, the existing drive shaft of a vehicle can be removed, and replaced directly with the arrangement 120, as the through shaft 121 and the yokes 122, 123 are arranged to have the same elongate extent as a normal drive shaft arrangement.

The arrangement of FIG. 9 is an expanded view of part of the assembled arrangement shown in FIG. 11, while FIG. 10 is a cross-sectional view of the arrangement of FIG. 9. Referring to FIG. 9, the yoke 122 is secured to a threaded end of the through shaft by a nut 124. The through shaft 121 includes splined sections 125 and 126, for cooperating with splined openings in component parts that are secured to the shaft. The shaft 121 extends through a plurality of pars comprising a front manifold 127, a pump housing 128, a pump assembly 129 having a rotatable swash plate 130, a plurality of pistons 131 and a cylinder casing 132. A stationary valve plate 133 seats between the cylinder casing 132 and a rear manifold 134, comprising manifold parts 135, 136 fixed to the end of the housing 128. A sleeve or bush 137 is attached to the shaft 121 in splined engagement therewith and the sleeve extends through the manifold parts 135 and 136 and rotates with the shaft 121. A roller bearing 13B is provided between the sleeve 137 and the manifold 134. The arrangement 120 further includes bolts 139 provided for securing the parts thereof together.

A cross-sectional assembled view of the arrangement shown in FIG. 9 is shown in FIG. 10, in which the same reference numerals are used to denote the same parts.

The pump assembly 129 operates in a known manner such that angular displacement or tilting of the swash plate 130 results in fluid being pumped through the assembly. Angular displacement of the swash plate 130 occurs about the axis of pins 140 which locate the swash plate, while that displacement is initiated by changing the balance in the pilot pressure, preferably by an electrical signal received from a controller of the energy management system. The pilot pressure acts in a known manner in pump assembly 129 on the swash plate cradle cylinders and the change in balance is such as to move and hold the swash plate in the desired position. Because the type of pump illustrated in FIGS. 9 to 11 is of a known kind, only brief details of its operation will be provided. The pistons 131 are fixed at the end thereof disposed outside the cylinder casing 132, in a slip joint 141 that engages the inside face of the swash plate, such that the pistons 131 can rotate relative to the swash plate about the axis of the shaft 121. When the inside face of the swash plate 130 is disposed in a plane perpendicular to the axis of the shaft 121, the pistons 131 and the cylinder casing 132 rotate without relative reciprocating movement. However, when the swash plate is rotated about the axis of the pins 137, reciprocating movement does occur and fluid is pumped by that movement. Fluid enters each cylinder on the suction stroke of the pistons through cylinder ports 142 and is pumped out of each cylinder through the same ports on the compression stroke of the pistons. The swash plate 130 can be rotated in either direction about the axis of the pins 137. The direction of rotation of the swash plate 130 control whether the system drives or retards the drive shaft, or whether no drive or retardation occurs in one direction of rotation, fluid will be pumped by the pump assembly 129 to retard the through shaft 121, while the direction of rotation will allow the pump assembly to act as a motor to drive the through shaft 121. The amount of rotation determines the amount of retarding or driving force exerted by the pump assembly 129. When the swash plate 130 is not rotated, the pump 129 displaces no hydraulic fluid and so no retarding or drive occurs. A suitable form of swash plate pump is manufactured by Sauer Sundstrand and is known as a Series 45 axial piston open circuit pump. Such a pump is appropriate for both forms of the invention described herein.

The arrangement 120 includes internal porting which advantageously facilitates reduction the number of parts constituting the arrangement and facilities a compact construction. The internal porting replaces the normal external porting of each pump, so that, as seen in FIGS. 9 and 10, the only external ports are those of ports 143 and 144 which are disposed at either ends of the arrangement 120, for ingress and egress of fluid. Flow of fluid through the ports 143, 144 can be in either direction, depending on whether the energy management system is in drive or retard mode. No flow occurs when the system is in neutral mode.

The arrangement 120 preferably is fully flooded for operation. That is, the level of fluid within the housing 128 is preferably filled to submerge the entire cylinder casing 132, so that during operation of the pump 129, fluid is available for receipt within each of the cylinders of the casing.

Figure 12A:
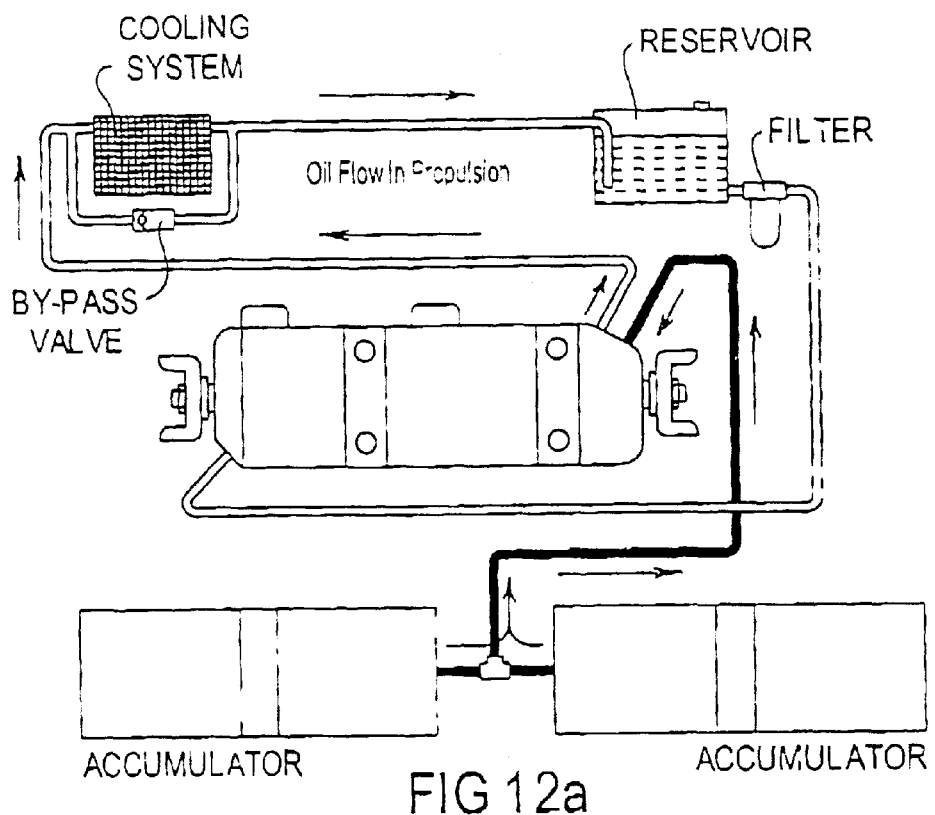
FIGS. 12a, 12b and 12c show layout views of fluid flow through the energy management system of the invention.
Figure 12B:
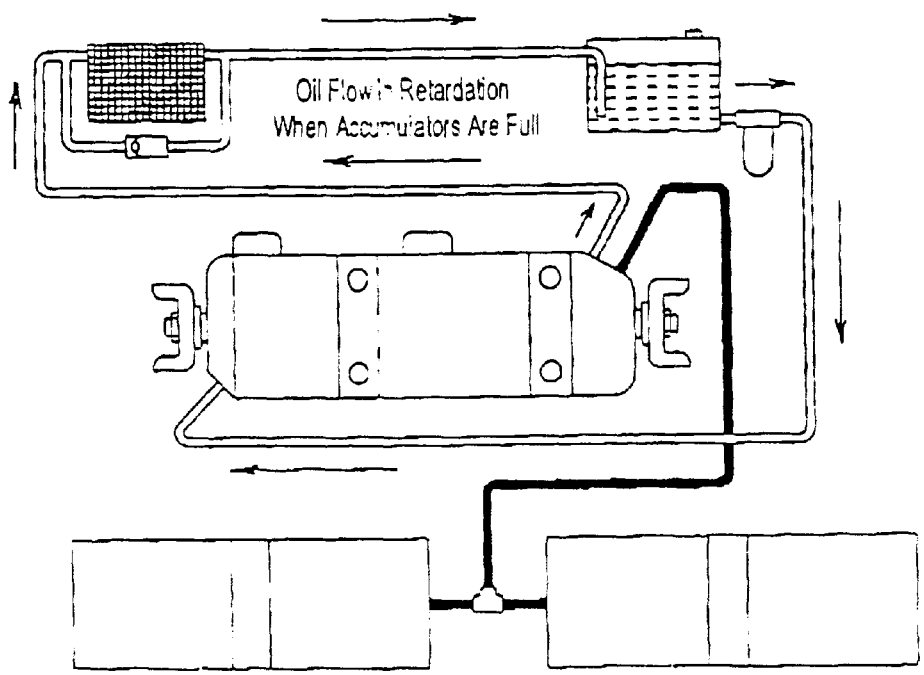
Figure 12C:
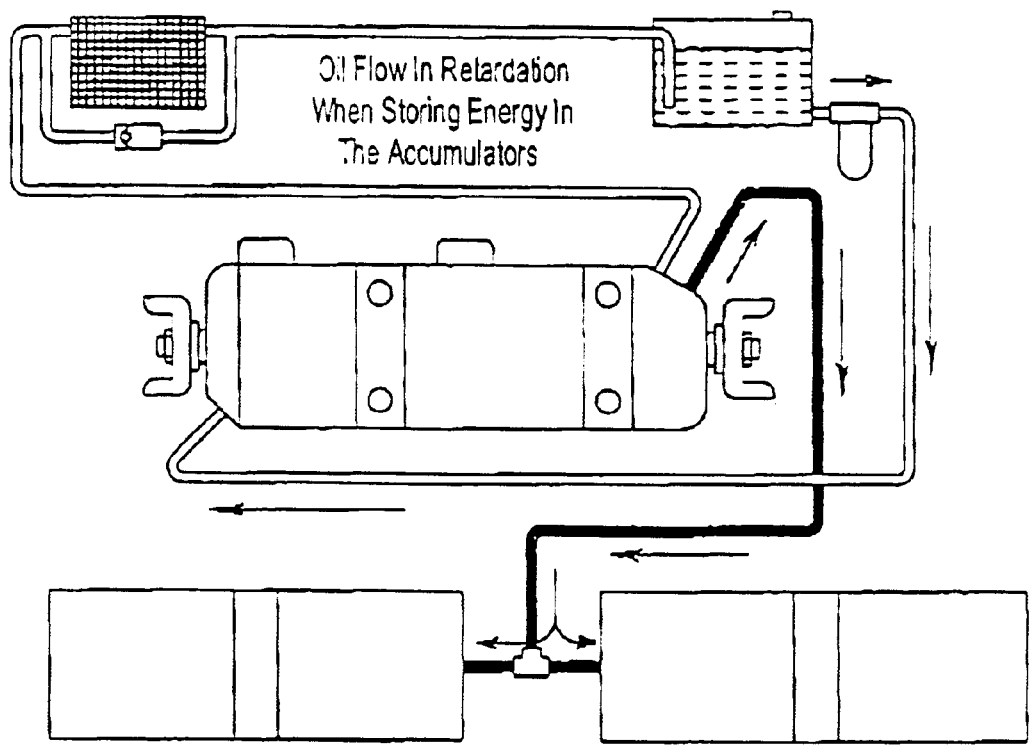

The ports 144 represent connections between the accumulators and the reservoir respectively, while the port 143 represents a connection from the accumulators. In this arrangement, the internal porting conveniently facilitates the provision of only three external ports, so that only three hydraulic hoses required to be connected to the arrangement 10. FIGS. 12a, 12b and 12c shows the flow of fluid from the ports 143 and 144 during three different operations of the energy management system that employs the pumping arrangement of FIGS. 9 to 11. The components of FIG. 12a are marked. The same components are included in FIGS. 12b and 12c. As shown, only three hoses are attached to the arrangement 120.

FIG. 10 illustrates the use of an adjustable yoke arrangement applied at the connection between the yoke 123 and the shaft section 126. The yoke 23 includes an integral sleeve 145 which is splined and which can be fitted to the shaft section 126 to provide for minor adjustment in drive shaft length. Thus, the one arrangement 120 can replace a range of existing vehicle drive shafts which vary in length, by adjusting the relative position between the yoke 123 and the shaft section 126.

FIG. 11 illustrates a further arrangement 150, which is a modified form of the arrangement 120. The modification resides in the number of pump assemblies positioned on the through shaft and in the arrangement 150, four pump assemblies are shown. These pump assemblies 151 to 154 are connected together along the through shaft which extends between the yokes 155 and 156. Each of the pump assemblies 151 to 154 includes a balanced logic element 157 and a solenoid actuator 158 to control the function of that element. The balanced logic element 157 controls the pilot pressure to the swashplate 130 and is itself controlled by the solenoid actuator 158.

The assemblies 120, 150 function in the energy management system to retard or drive the vehicle to which they are applied in the same manner as described in relation to the earlier figures. The number of pump assemblies employed in the arrangement is optional, although with the type of pumps described above, four such assemblies is considered to be appropriate by way of size restrictions, ie available space to mount the pump assemblies between drive shaft yokes, and by way of energy capacity. However, radially larger pump assemblies could be employed if less than four pump assemblies was necessary, or if greater energy capacity was required.

When the arrangement shown in FIGS. 9 to 11 is fitted to a vehicle, appropriate torque arm attachments are required to ensure that the various stationary parts of the arrangement do not spin when the shaft 121 rotates. This is within the knowledge of a person skilled in the art.

Figure 13:
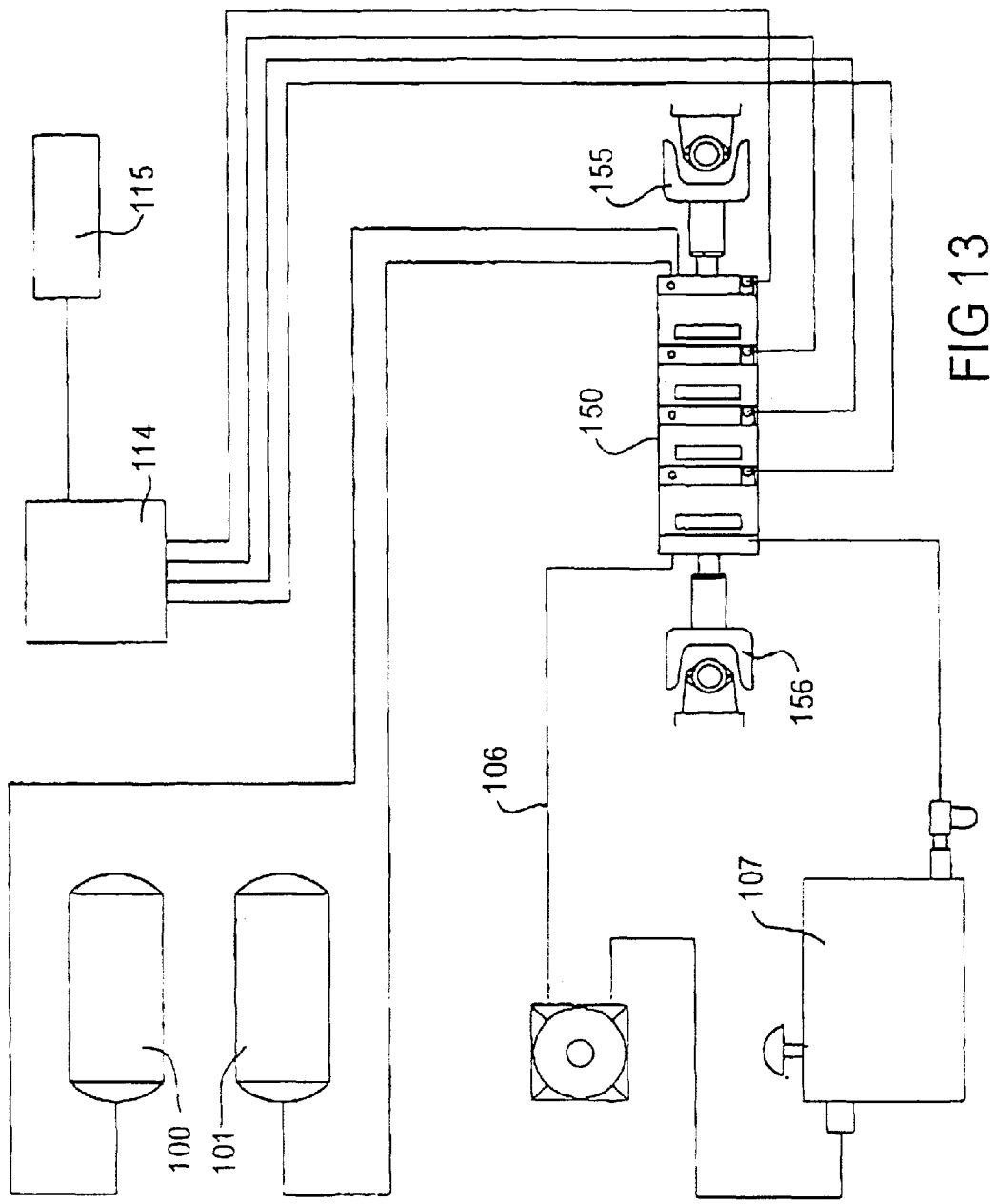
FIG. 13 is an alternative layout view of an energy management system according to the invention.

FIG. 13 shows layout of an energy management system according to the invention. The layout drawing is similar to that of FIG. 8 and differs principally by the inclusion of the pumping arrangement 150 of FIG. 11. Thus, it can be seen that the energy management system is operable with either of the pumping arrangements shown in FIGS. 8 or 13.

The energy management system can include a variety of safety checks and features to ensure safe running of the system at all times. A first safety feature can be provided to ensure that the accumulator cannot be accessed, either by mistake or for maintenance purposes, while the accumulator is in a pressure accumulated state, ie in a state in which the accumulator is storing accumulated energy for, propulsive purposes. The likelihood of someone accessing the accumulator is only a real possibility when the vehicle is stationary and therefore, this safety feature employs a reader that reads rotation of the vehicle drive shaft. If the reader, which can be of any suitable kind, reads a zero RPM of the drive shaft for a period of 5 seconds, then a strobe which is mounted at the emergency discharge end of the accumulator is activated, and if the strobe is cut by any movement, such as would occur if a person attempted to work on the accumulator, then a signal is sent to the microprocessor to immediately discharge the accumulated energy. That discharge occurs by direct release of the oil held in the right-hand chamber 31 of the accumulator 10 into the oil reservoir. The alternative is to release the nitrogen gas from the left-hand chamber 30, but that gas could be under very high pressure so as to be dangerous to release in the vicinity of anyone in the immediate area and additionally, unless the gas was released to a reservoir, it would then have to be replaced.

When the drive shaft reader reads an RPM above zero, then the strobe is turned off and thus the above described safety feature is disabled.

When the system is switched on to provide vehicle propulsion, the microprocessor commences receipt of information from various sources, preferably including but not limited to a body roll inclinometer, an incline/decline inclinometer, a road speed indicator and an available pressure indicator which reads available pressure from the accumulator gas chamber. Under certain circumstances, the microprocessor, can also determine the amount of propulsion required as with be described hereinafter in terms or a memory system. The information can be obtained from these sources by any suitable means. Advantageously, the system car be arranged to provide a terrain logging and prediction facility, so that over several runs along the same route, information can be obtained about that route so that the system can efficiently provide retardation and propulsion for the vehicle over the entire extent of the route. Preferably, the facility will enable forward calculation) of the energy required over sections of a route being travelled and will cause the accumulators to be charged at the most efficient rate for the particular route to accommodate the energy required. This facility will reduce the manual interaction required of the driver in driving the vehicle, so that the driver is not diverted from his or her normal driving duties and human error in operating the system is substantially eliminated.

The terrain logging and prediction facility includes one or more, and preferably a pair of inclinometers or equivalent devices or arrangements, that measure chassis roll transverse to the length of the vehicle as well as negative or positive incline relative to that length. The facility includes a memory facility, most preferably a computer, that receives data from the inclinometers and stores that data for later recovery. The stored data can then be used when the vehicle returns to the same route to alert the microprocessor to the contour of that route ahead of the vehicle travelling over any part of the route. The facility can, by virtue of this memory, cause the system to change and discharge the accumulator at maximum efficiency. This is particularly pertinent to accumulator discharge, as the facility will alert the system to parts of the route that for example, require slow discharge of energy over a long period and to other parts of the route that require a higher discharge over a shorter period. The facility will also enable the accumulator to fully discharge over an incline at a constant rate, because the stored data will provide both the length and height of the incline, so that the system can discharge the accumulator at the most efficient rate. The facility can also be arranged to measure the weight of the vehicle load, from pressure transducers in the suspension. That information further assists the facility to discharged the accumulator at the most efficient rate.

The memory of the facility can enable it to provide a position indicator for the vehicle, so that at any point along the route, the vehicle driver, or a locating station remote from the drive, receive a signal from the vehicle can accurately locate the position of the vehicle on the route. Thus, the driver is not required to keep track of his or her progress along the route, such as by visual identification of signage along the side of a road. The ability of the facility to operate in this manner, is by memorising and constantly monitoring the route conditions. The facility will recognise a pattern in the route and match that pattern to the stored data to determine the position of the vehicle along the route. The memory of this facility can also be downloaded for transfer to other vehicles fitted with the facility.

The facility may include means for the driver to identify the route being taken, so that there is no need to look for a pattern match, although if the vehicle diverges from the selected route, that may result in incorrect functioning of the system. Therefore, it is preferable that the facility continue to match the route pattern the vehicle is travelling with the stored pattern data, so that deviations between the patterns can prompt the facility to look for a different pattern match.

The facility preferably continuously stores route data about the particular route being travelled, to constantly refine the memory of that route and to adjust to temporary or permanent deviations therefrom. The stored data can be used to provide relevant information, such as distance to the end of the route and estimated time of arrival. Also, the data can be used for vehicle logs for access by appropriate authorities.

The system includes a driver command panel operable by the vehicle driver for the purpose of selecting the operational characteristics of the system required. The command panel preferably includes a vehicle speed selector for selecting vehicle speed, on one hand to govern the speed at which retardation occurs, and on the other hand to govern the speed of the vehicle under propulsion. In retardation mode, if the selected speed for retardation to commence was manually set by the driver at 100 KPH, then the system would apply a retardation force at any time the vehicle exceeded that speed. For practical purposes, the system could employ a set limit past the selected speed, such as 2 KPH before retardation commenced to a low for error in the speed monitoring system.

Retardation commences by ramping the swash plate angle of the pump as earlier described. If the speed continues to increase, such as by an amount of a further 1 KPH, the swash plate angle will be further ramped and ramping will continue to be increased until the vehicle is slowed to the selected speed. It the selected speed cannot be obtained, then a warning signal will issue and the driver can apply a braking force, such as by engine or wheel brakes, or by selecting a lower gear. As the vehicle is slowed to the selected speed the controller will reduce the ramp of the swash plate angle so that the vehicle is not retarded to a speed lower than the selected speed. Retardation will be deactivated by the system at any time the driver commences acceleration and the system can sense acceleration by sensing means applied at the turbo boost manifold or at the accelerator potentiometer. Alternatively, retardation will be deactivated if the system cannot apply a retarding force and still maintain the vehicle at the selected speed. That is, if the decline down which the vehicle is travelling is not sufficient for the vehicle to maintain its speed as selected under even minor retardation, then the retarding force will be removed.

The system can be applied advantageously when the driver changes gear. Under acceleration, any time a gear is changed, propulsion of the vehicle is momentarily interrupted and the vehicle loses speed. This is particularly evident when the vehicle is travelling up an incline, as the vehicle can lose substantial forward momentum. However, in a vehicle fitted with the energy management system of the present invention, accumulated energy can be used to apply a propulsive force during a gear change so that vehicle momentum is maintained. This preferably occurs automatically and the control system, for example, can be arranged to identify when a gear change is taking place, so that the propulsive force car, be applied.

The system preferably includes an alarm or a plurality of alarms that alert the driver when the various parameters manually selected by him or her are exceeded. Such an alarm may sound if the accumulator is fully discharged, or when selected speeds are exceeded. The alarms can be visual or audio or both and preferably can be switched off by the driver. The alarms may be set to reappear or resound after being turned off by the driver if the exceeded parameters remain in that condition and that may occur for example, after a period of 60 seconds.

The system can be arranged so that the retardation provided can be as an assistance to the normal braking system or as separate thereto. Where the system can operate to assist the normal braking system, the system includes sensing means suitable to sense depression of the foot brake or hand brake, or to sense other characteristics associated with application of the brake system such as brake air pressure sensed by a suitable transducer, and to apply a retarding force additional to the braking force. The retarding force is preferably variable and is dependent on the pressure applied by the braking system. For example, if the brake air pressure transducer was to read zero KPA, then the system would apply zero ramp angle to the pump swash plate for zero retard torque. If the transducer read 100 KPA, that would result in 50% ramp angle at 50% maximum retard torque, and at a reading of 200 KPA, 100% ramp angle at 100% retard torque.

The present invention provides numerous advantages over systems known in the prior art. The system provides far greater control over the accumulation and dissipation of energy to a vehicle and the controllers provided in the system allow for partial or complete atomisation of the system, so that driver input to operate the system can be minimised. It is expected that fuel savings in the order of 10% to 20% will be achieved for prime movers operating on long runs. Similar savings can also be expected for shorter runs, although the saving will be more dependant on the manner in which the prime mover is driven. Additionally, the system will serve to increase engine gearbox, brakes and differential life, by the order of 10% to 20%. These advantages far exceed those obtained by prior art systems. The system also has other benefits of an environmental kind, such as reduction in exhaust emissions, brake pad and drum dust emissions and noise emissions (due to less use, or elimination of the engine brake) Further benefits result from reduced maintenance requirements reduced travel times (due to more constant vehicle speed, particularly uphill) and less driver fatigue.

It is also to be appreciated, that while the benefits of the system are readily apparent for long haulage runs through the country, the system is still highly beneficial for city runs. In the city, the system will run on a 1:2 gear ratio (as described earlier) or other such ratio as considered appropriate, and this ratio is higher than the ratio applied for country runs and therefore, the system will generate greater torque and have greater efficiency on city runs (in the order of twice the levels achieved in a 1:1 country gear ratio compared to a 1:2 city gear ratio). Thus, the system is also very beneficial on city routes. This is particularly applicable for countries or areas that employ large scale rail transport, instead of prime mover or trucking transport.

The invention described herein is susceptible to variations, modifications and/or additions other than those specifically described and it is to be understood that the invention includes all such variations, modifications and/or additions which fall within the spirit and scope of the above description.

What is claimed is:

1. An energy management system operable in three modes of operation including a driving mode to drive a drive shaft of a vehicle, a retarding mode to retard said drive shaft of the vehicle and a neutral mode to have no driving or retarding influence on said drive shaft, said system comprising an energy accumulator operable to store and release energy through receipt and release of fluid, a pump in fluid communication with said energy accumulator, a reservoir of fluid in communication with said pump, and a coupler adapted to couple said pump to said drive shaft, whereby in said retarding mode of said system, said drive shaft drives said pump to pump fluid to said energy accumulator, and whereby in said driving mode of said system, said energy accumulator releases fluid to drive said pump which drives said drive shaft, and whereby in said neutral mode of said system, said pump is inoperative to exert any driving or retarding influence on said drive shaft, the system further including at least one sensor adapted to provide input signals indicative of selected system parameters including vehicle ground speed, and a controller incorporating a microprocessor adapted to regulate the modes of operation of said pump and said accumulator in response to said input signals.

2. An energy management system according to claim 1, wherein said pump is disposed coaxially about said drive shaft, such that an input shaft of the pump and said drive shaft of the vehicle are effectively integral.

3. An energy management system according to claim 2, wherein said coupler includes a splined connection between said drive shaft and said pump.

4. An energy management system according to claim 1, wherein said pump includes an axial piston hydraulic pump.

5. An energy management system according to claim 4, wherein said pump includes a plurality of axial piston pumps arranged co-axially along said drive shaft.

6. An energy management system according to claim 5, wherein said pump is internally ported to permit flow of fluid through said plurality of axial piston pumps.

7. An energy management system according to claim 4, wherein each said axial piston pump has a plurality of axially disposed pistons, and a cylinder casing having a plurality of axially disposed cylinders for receipt of said plurality of pistons, said coupler including a splined connection between said cylinder casing and said drive shaft.

8. An energy management system according to claim 4, wherein said pump includes three external ports for ingress and egress of fluid, a first of said ports communicating with an inlet of said fluid reservoir, a second of said ports communicating with an outlet of said fluid reservoir and a third of said ports communicating with said accumulator.

9. An energy management system according to claim 8, wherein a heat exchanger is disposed between said first port and said fluid reservoir.

10. An energy management system according to claim 4, wherein said axial piston pump has a tiltable swash plate to vary pump displacement.

11. An energy management system according to claim 1, wherein said coupler couples said pump to said drive shaft through a gearing facility which includes drive gears attached to said drive shaft for meshing with drive gears attached to a second shaft that drives said pump, a clutch being employed to transmit drive and being disengaged in said neutral mode of said system.

12. An energy management system according to claim 11, wherein said gearing facility includes a pair of drive gears of different diameter mounted to said shaft of said gearing facility and meshing with a pair of gears mounted to said drive shaft for transmitting drive between said pump and said drive shaft at one of two different ratios.

13. An energy management system according to claim 12, wherein selection between said pair of drive gears is controlled by a selector facility having a selector shaft that moves laterally to the axis of said drive gears for movement thereof permitting selective engagement between said respective pairs of gears on said drive shaft and said second shaft.

14. An energy management system according to claim 13, wherein said selector shaft is controlled by a solenoid operated pneumatic actuator.

15. An energy management system according to claim 1, wherein said accumulator includes a gas/liquid accumulator that stores energy by gas compression and releases energy by fluid emission.

16. An energy management system according to claim 1, further comprising an optical sensor adapted to sense relative movement between adjacent selected parts of said system and upon sensing of such movement when said drive shaft is not rotating, said controller operates to discharge said accumulator.

17. An energy management system according to claim 16, wherein said optical sensor includes a light source and wherein interruption of light from said light source causes a signal to be sent to said controller to effect discharge of said accumulator.

18. An energy management system according to claim 1, further comprising a flow controller through which fluid is pumped, said flow controller providing resistance to pumping so that said pump exerts a retarding force on said drive shaft.

19. An energy management system according to claim 18, wherein said flow controller is adapted to provide a substantially constant retardation force relative to pump flow rate in the retarding mode independent of a charge state of the accumulator.

20. An energy management system according to claim 19, wherein said flow controller is adapted to maintain substantially constant hydraulic pressure respectively between said pump and said accumulator and between said pump and said reservoir, thereby providing said substantially constant retardation force.

21. An energy management system according to claim 20, wherein said flow controller includes a balanced logic control element.

22. An energy management system according to claim 1, further comprising a load removal facility adapted to disconnect the vehicle engine from said drive shaft at times when the momentum of the vehicle causes said drive shaft to drive the vehicle engine, said facility including a disengagable coupling positioned between the engine and said pump.

23. An energy management system according to claim 22, wherein said disengagable coupling is operative to slip when said drive shaft drives the engine and to couple when the engine drives said drive shaft.

24. An energy management system according to claim 23, wherein said disengagable coupling is selectively lockable against slipping.

25. An energy management system according to claim 24, wherein said disengagable coupling includes a pin that is movable between a locked position and an unlocked position relative to said disengagable coupling, said pin being receivable in bores in respective couplable parts of the engine and said drive shaft whereby removal of said pin from one of said bores permits disengagement of said disengagable coupling.

26. An energy management system according to claim 1, wherein said controller is programmable.

27. An energy management system according to claim 1, wherein said microprocessor includes a programmable logic controller.

28. An energy management system according to claim 1, wherein said controller includes a computer.

29. An energy management system according to claim 1, wherein said controller includes a command module adapted to receive manual inputs from an operator.

30. An energy management system according to claim 1, wherein said at least one sensor further comprises one or more of a body roll inclinometer; an incline/decline inclinometer; a road speed indicator; an accumulator pressure indicator; a turbo boost pressure indicator; an accelerator potentiometer; a brake depression sensor; a brake pressure transducer; a load weight sensor; and a gear change sensor.

31. An energy management system operable in three modes of operation including a driving mode to drive a drive shaft of a vehicle, a retarding mode to retard said drive shaft of the vehicle, and a neutral mode to have no driving or retarding influence on said drive shaft, said system comprising an energy accumulator operable to store and release energy through receipt and release of fluid, a pump in fluid communication with said energy accumulator, a reservoir of fluid in communication with said pump, and a coupler adapted to couple said pump to said drive shaft, whereby in said retarding mode of said system, said drive shaft drives said pump to pump fluid to said energy accumulator, and whereby in said driving mode of said system, said energy accumulator releases fluid to drive said pump which drives said drive shaft, and whereby in said neutral mode of said system, said pump being inoperative to exert any driving or retarding influence on said drive shaft, said system further comprising an optical sensor adapted to sense relative movement between adjacent selected parts of said system and upon sensing of such movement when said drive shaft is not rotating, said controller operates to discharge said accumulator.

32. An energy management system according to claim 31, wherein,
said coupler couples said pump to said drive shaft through a gearing facility which includes drive gears attached to said drive shaft for meshing with drive gears attached to a second shaft that drives said pump and a clutch being employed to transmit drive and being disengaged in said neutral mode of said system.

33. An energy management system according to claim 32, wherein said gearing facility includes a pair of drive gears of different diameter mounted to said shaft of said gearing facility and meshing with a pair of gears mounted to said drive shaft for transmitting drive between said pump and said drive shaft at one of two different ratios.

34. An energy management system according to claim 33, wherein selection between said pair of drive gears is controlled by a selector facility having a selector shaft that moves laterally to the axis of said drive gears for movement thereof permitting selective engagement between said respective pairs of gears on said drive shaft and said second shaft.

35. An energy management system according to claim 34, wherein said selector shaft is controlled by a solenoid operated pneumatic actuator.

36. An energy management system according to claim 31, wherein said optical sensor includes a light source and wherein interruption of light from said light source causes a signal to be sent to said controller to effect discharge of said accumulator.

37. An energy management system according to claim 31, wherein,
said system further comprises a load removal facility adapted to disconnect the vehicle engine from said drive shaft at times when the momentum of the vehicle causes said drive shaft to drive the vehicle engine, said facility including a disengagable coupling positioned between the engine and said pump and being operative to slip when said drive shaft drives the engine and to couple when the engine drives said drive shaft.

38. An energy management system according to claim 37, wherein said disengagable coupling is selectively lockable against slipping.

39. An energy management system according to claim 38, wherein said disengagble coupling including a pin that is movable between a locked position and an unlocked position relative to said disengagable coupling, said pin being receivable in bores in respective couplable parts of the engine and said drive shaft whereby removal of said pin from one of said bores permits disengagement of said disengageable coupling.

* * * * *